United States Patent
Buettiker et al.

(10) Patent No.: US 7,431,543 B2
(45) Date of Patent: Oct. 7, 2008

(54) MACHINE REAMER

(75) Inventors: Otto Buettiker, Gunzgen (CH); Roman Eigenmann, Oftringen (CH); Jacek Kruszynski, Stuttgart (DE)

(73) Assignee: Dihart AG, Dulliken (CH)

( * ) Notice: Subject to any disclaimer, the term of this patent is extended or adjusted under 35 U.S.C. 154(b) by 424 days.

(21) Appl. No.: 10/504,502

(22) PCT Filed: Feb. 18, 2002

(86) PCT No.: PCT/EP02/14430

§ 371 (c)(1),
(2), (4) Date: May 6, 2005

(87) PCT Pub. No.: WO03/068439

PCT Pub. Date: Aug. 21, 2003

(65) Prior Publication Data

US 2005/0220551 A1   Oct. 6, 2005

(30) Foreign Application Priority Data

Feb. 15, 2002  (DE) ................. 102 06 610
May 29, 2002  (DE) ................. 102 24 228

(51) Int. Cl.
*B23B 31/11* (2006.01)

(52) U.S. Cl. .............. 408/233; 279/8; 408/59; 408/239 R; 409/234

(58) Field of Classification Search .......... 408/231–233, 408/226, 238–239 A; 409/232, 234; 279/8; 407/53, 54; B23B 31/11, 29/04, 29/06, 27/16; B23C 5/26; B23D 77/00

See application file for complete search history.

(56) References Cited

U.S. PATENT DOCUMENTS

| 495,256 | A | * | 4/1893 | Martignoni | 407/64 |
| 2,383,688 | A | * | 8/1945 | Donaldson | 279/8 |
| 2,867,140 | A | * | 1/1959 | Getts | 408/57 |
| 2,995,963 | A |   | 8/1961 | Lavallée | |
| 3,087,360 | A | * | 4/1963 | Garberding | 408/227 |
| 3,320,833 | A |   | 5/1967 | Andreasson | |
| 4,166,711 | A | * | 9/1979 | Kress et al. | 408/233 |

(Continued)

FOREIGN PATENT DOCUMENTS

DE   2907994 A1 * 11/1979

(Continued)

OTHER PUBLICATIONS

PCT International Preliminary Examination Report (PCT/EPEA/409) (4 pages).

*Primary Examiner*—Daniel W Howell
(74) *Attorney, Agent, or Firm*—Flynn, Thiel, Boutell & Tanis, P.C.

(57) ABSTRACT

A machine reamer has a base and a reamer head configured as a one-piece indexable insert that axially projects beyond the front of the base. The indexable insert can be introduced in a front insert seat of the base with an axially projecting, preferably conical shoulder and can be clamped therein by a tension rod that extends through the center-axis of the base. In order to improve the rotational catch effect between the base and the indexable insert, the indexable insert has a central polygonal opening through which the tension rod engages with a complementary polygonal section.

15 Claims, 4 Drawing Sheets

U.S. PATENT DOCUMENTS

| | | | |
|---|---|---|---|
| 4,929,131 A * | 5/1990 | Allemann | 409/234 |
| 5,238,335 A * | 8/1993 | Nomura | 408/59 |
| 5,607,263 A * | 3/1997 | Nespeta et al. | 407/61 |
| 6,540,449 B1 * | 4/2003 | Bejerst.ang.I et al. | 407/40 |
| 6,896,450 B2 * | 5/2005 | Rothenstein | 408/59 |
| 7,189,039 B2 * | 3/2007 | Pantzar | 409/234 |

FOREIGN PATENT DOCUMENTS

| | | | |
|---|---|---|---|
| DE | 29912751 U | 11/2000 | |
| EP | 0734803 A | 10/1996 | |
| EP | 1090705 A2 * | 4/2001 | |
| JP | 10249627 A * | 9/1998 | |
| JP | 10309616 A * | 11/1998 | |
| WO | WO 01/64381 A2 | 9/2001 | |
| WO | WO2002076661 A1 * | 10/2002 | |

* cited by examiner

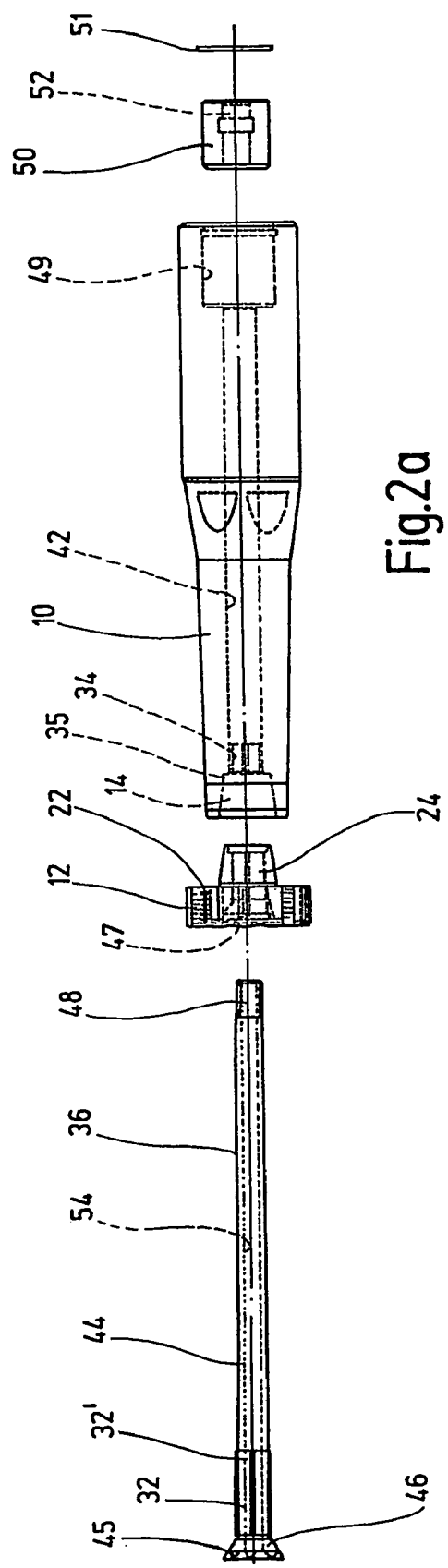
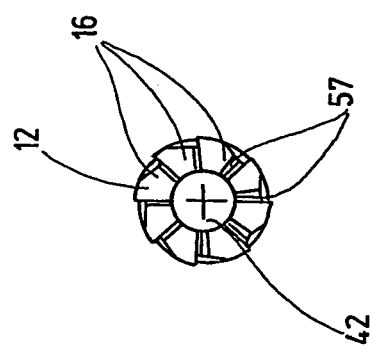
Fig.2a
Fig.2b

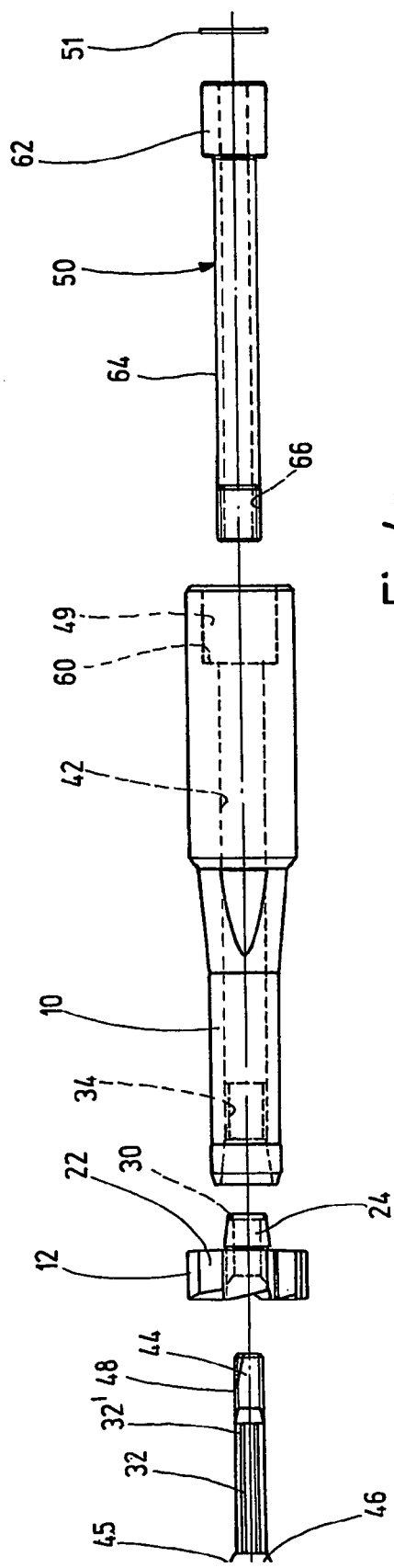
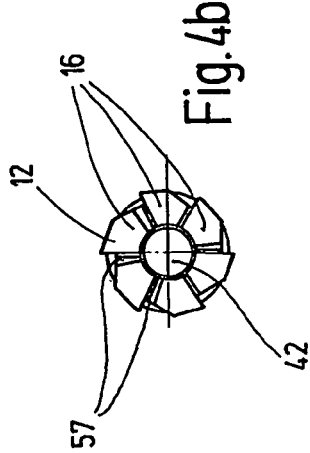

MACHINE REAMER

The invention relates to a machine reamer comprising a shaft-like base and a reamer head, which axially projects beyond the front of the base and which is designed as a one-piece indexable insert. The reamer head can be introduced into a front-side insert seat of the base with an axially projecting shoulder, and can be clamped therein by means of a tension rod, which extends axis-centrally through the base.

Machine reamers of this type are utilized for the precision working of cylindrical bores with the goal of a high precision in dimension and form. An important characteristic of a machine reamer is the coaxiality of the reamer head in relationship to the axis of rotation. In a conventional machine reamer of this type (WO 01/64381), the reamer head can be clamped with a conical shoulder into a complementary face-side insert seat of the base by means of a tension rod to provide the necessary coaxiality. It has, however, been shown that particularly with small sizes, a rotational catch through a conical shoulder is not automatically guaranteed. It is furthermore important for special uses that the tension rod is rotationally positioned exactly with reference to the blades of the cutting head.

Starting out from this, the basic purpose of the invention is to further improve the conventional machine reamer so that a good rotational catch is guaranteed and that the tension rod can be exactly positioned in the rotational direction with reference to the reaming head.

To attain this purpose the combination of characteristics disclosed in Patent Claim 1 is suggested. Advantageous embodiments and further developments of the invention result from the dependent claims.

The inventive solution consists most of all in the tension rod having a complementary polygonal section extending through an axis-central polygonal opening of the indexable insert. A further improvement in this respect is achieved by the base also having at least in the vicinity of its insert seat a central polygonal opening, through which extends axially a complementary polygonal section of the tension rod. The two polygonal sections of the tension rod advantageously follow one another directly and thereby extend in axial direction through the separation point provided between the indexable insert and the base in the area of the insert seat.

The tension rod has advantageously a head, which rests against a face of the indexable insert, and which is followed in axial direction by the polygonal sections.

A preferred embodiment of the invention provides that the tension rod head rests with a conical clamping surface against a complementary inner cone portion on the face of the indexable insert. The tension rod head is dimensioned advantageously so that it is countersunk in the clamped-in state in the inner cone portion. With this measure it is achieved that even blind holes can be completely reamed down toward their base.

A further advantageous embodiment of the invention provides that the tension rod has an axial bore, which can be loaded with a cooling lubricant, and which ends in the area of the tension rod head in radial channels leading to the blades of the indexable insert. The radial channels are thereby arranged with respect to the polygonal arrangement in the tension rod and in the indexable insert so that they penetrate on the outlet side through the conical clamping surface and end there each in an associated free space provided in front of the blades of the indexable insert. The inventive cooling channel guide with a continuous cooling channel directly to the axial blade positions enables a wetting of the wall of the bore, which wetting precedes the cutting. Thus even at the highest cutting speeds a sufficient lubrication of the tool is always guaranteed. This is of a particular importance for a minimal amount of lubrication, where an oil-air mixture is used as the cooling lubricant.

A further advantageous embodiment of the invention provides that the base has an axis-central recess at its end not facing the insert seat, in which recess is arranged a tension nut, which can be screwed onto a thread of the tension rod. The tension nut has an internal thread, which can be screwed onto an external thread of the tension rod. The tension nut is thereby arranged rotatably and axially nonmovably in the recess. It is advantageously held in the recess by a snap ring.

The tension nut has according to a preferred embodiment of the invention a head portion axially supportable on an annular boundary surface of the axis-central recess and a shaft portion extending through an axial bore of the base, whereby the shaft portion carries at its free end the female thread, which can be screwed onto the thread of the tension rod. It is achieved with these measures, that the thread of the tension rod can be arranged directly behind the polygonal section and that the tension rod can thus be significantly shortened. The shaft portion of the tension nut, which shaft portion is preferably designed as a hollow shaft, has a greater diameter than the tension rod, and can therefore be designed longer than the tension rod with a given stiffness same. It is furthermore possible to provide inside of the hollow shaft a coolant channel with a larger dimension, which channel communicates with the axial bore in the tension rod.

The rigging of the tension rod is done by tightening the tension nut with the help of a screwing tool. The tension nut has for this purpose a polygonal opening axially accessible from outside for the engagement by the tool. When the polygonal opening of the tension nut corresponds in dimensions to the polygonal opening of the indexable insert, it is possible to use the same tool to loosen the indexable insert from its frictional rigging in the base during its exchange after the tension rod has been removed. The polygonal opening is for this purpose preferably designed as a hexagonal recess for the engagement by a hexagonal key or wrench.

With the inventive measures it is achieved that the tension rod and the tension nut are positioned floatingly in the base and in the indexable insert. A purely axial rigging of the system is in this manner obtained during tightening of the tension nut with the result that the vibration tendency is reduced and thus higher cutting speeds can be achieved.

The invention will be discussed in greater detail hereinafter in connection with the exemplary embodiments schematically illustrated in the drawings, in which:

FIG. 2a is a side view of the machine reamer according to FIG. 1 in an exploded illustration;

FIG. 2b is a top view of the indexable insert of the machine reamer according to FIG. 1;

FIG. 4a is a side view of the machine reamer according to FIG. 3 in an exploded illustration;

FIG. 4b is a top view of the indexable insert of the machine reamer according to FIG. 3.

Figure 1:
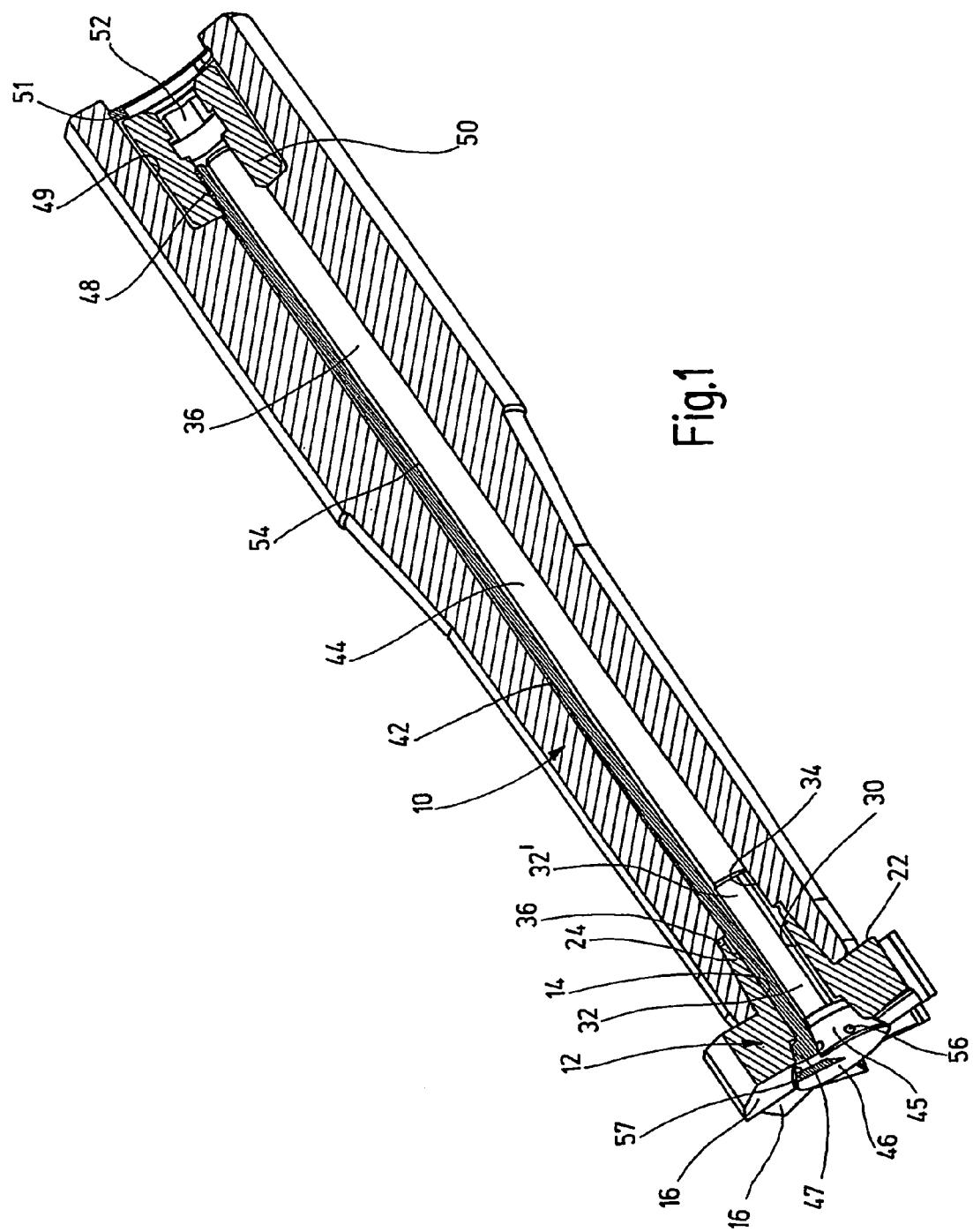
FIG. 1 is a diagrammatic cross-sectional illustration of a machine reamer with an indexable insert.

The machine reamers illustrated in the drawings have a base 10 designed as a shaft and a reamer head 12 axially projecting over the front of the base. The reamer head 12 is designed as a one-piece indexable insert, which can be clamped with an axial rigging clearance-free and coaxially self-centering into a front-side insert seat 14 of the base 10.

The indexable insert 12, which consists of a sintered cutting material, in particular of hard metal, has several cutting teeth 16, which are arranged spaced from one another in peripheral direction, and the pitch of which is uneven. It has furthermore a conical shoulder 24, which axially projects over a planar surface 22, and with which it can be anchored clearance-free in the insert seat 14.

The indexable insert 12 can be clamped in an insert seat 14 by means of a tension rod 44 extending through an axial bore 42 of the base 10. The tension rod 44 rests for this purpose with the cone surface 45 of its head 46, which cone surface is coaxial with respect to the longitudinal axis of the base, against a complementary face 47 of the indexable insert 12. The tension rod 44 has an external thread 48 at its end not facing the head 46, onto which external thread can be screwed the internal thread of the tension nut 50, which is arranged rotatably and axially nonmovably in a recess 49 of the base 10. The rigging is done by tightening the tension nut 50 with the help of screwing tool engaging the hexagonal recess 52. When the hexagonal recess 52 corresponds in dimension to the polygonal opening 30 in the indexable insert 12, the same tool can also be used to release the indexable insert from its rigging with the base 10. The tension rod 44 must for this purpose be removed first so that the polygonal opening 30 becomes accessible for the screwdrivers. The tension nut 50 is held axially nonmovably in the recess 49 with the help of a snap ring 51.

The exemplary embodiment of FIGS. 1 and 2 provides a relatively long and slender tension rod 44, which reaches with its external thread 48 into the area of the recess 49 of the base 10.

Figure 3:
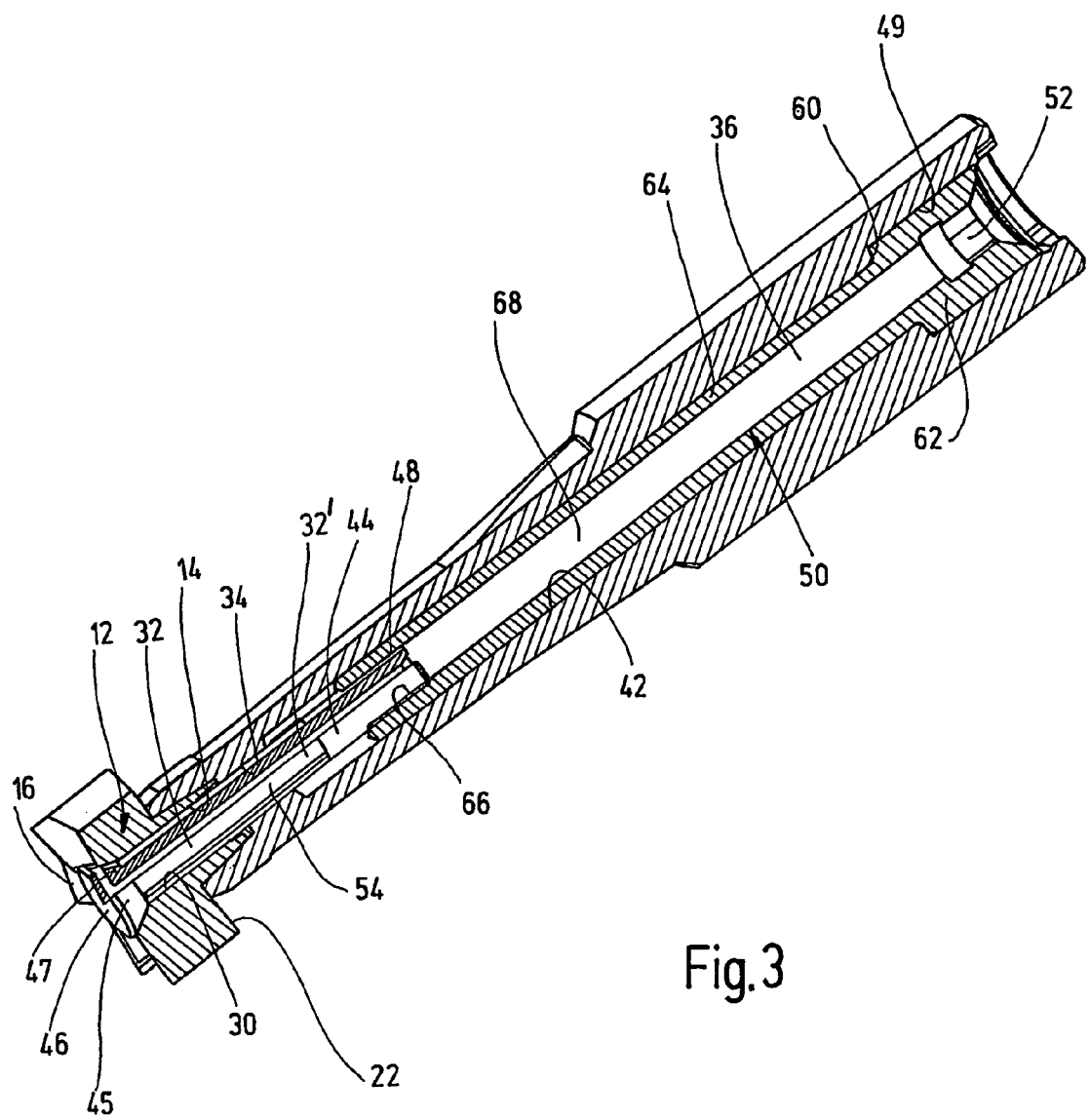
FIG. 3 is a diagrammatic cross-sectional illustration of a modified exemplary embodiment of a machine reamer with an indexable insert.

The exemplary embodiment illustrated in FIGS. 3 and 4 differs from the exemplary embodiment according to FIGS. 1 and 2 in that the tension nut 50 has a head portion 62, which can be axis-centrally supported on an annular boundary surface 60 of the axis-central recess 49, and a shaft portion 64, which extends through the axial bore 42 of the base 10. The shaft portion 64 has the female thread 66 at its free end, which female thread can be screwed onto the thread 48 of the tension rod 44. The external thread 48 of the tension rod can thus be arranged directly behind the polygonal section 32. The slender tension rod 44 is thus significantly shorter than in the exemplary embodiment according to FIGS. 1 and 2. Alltogether one obtains in this manner a more favorable configuration regarding stiffness and manufacturing costs.

The tension rod 44 and the tension nut 50 have an axial bore 54, which ends in radial channel 56 in the area of the tension rod head 46. A cooling lubricant is supplied to the blades 16 of the indexable insert 12 through the axial bore 54 and the radial channels 56. The axial bore 54 communicates in the exemplary embodiment illustrated in FIGS. 3 and 4 with the inside 68 of the hollow shaft 64. Since the inside diameter of the hollow shaft is greater than the bore diameter 54 in the tension rod, a smaller pressure drop occurs during the cooling lubricant supply in the exemplary embodiment according to FIGS. 3 and 4.

In order to precisely position the outlet areas of the radial channels 56 regarding the blades 16 in the area of the free spaces 57 of the indexable insert 12, the tension rod 44 has a complementary polygonal section 32 extending through an axis-central polygonal opening 30 of the indexable insert 12. This measure furthermore achieves an improvement in the rotational catch of the indexable insert 12 with the base 10 through the tension rod 44. A further improvement in this respect is achieved by the base having at least in the vicinity of its insert seat 14 a center polygonal opening, into which axially engages a complementary polygonal section 32' of the tension rod. The two polygonal sections 32, 32' of the tension rod follow one another directly, and penetrate in axial direction through the separation point 35 existing between the indexable insert 12 and the base 10 in the area of the insert seat 14. The tension rod 44 furthermore has a cylindrical portion 36, which is followed at its end by the external thread 48.

In conclusion the following is to be stated: The invention relates to a machine reamer with a shaft-like base 10 and a reamer head, which axially projects beyond the front of the base, and is designed as a one-piece indexable insert 12. The indexable insert can be introduced into a front insert seat 14 of the base 10 with an axially projecting, preferably conical shoulder 24, and can be clamped therein by means of a tension rod 44, which extends axis-centrally through the base 10. In order to improve the rotational catch between base 10 and indexable insert 12, the indexable insert 12 has an axis-central polygonal opening 30, through which the tension rod extends with a complementary polygonal section 32.

The invention claimed is:

1. A machine reamer comprising a base and a reamer head that axially projects beyond a front of the base, and comprises a one-piece indexable insert for introduction into a front-side insert seat of the base, the indexable insert having an axially projecting shoulder, for clamping by a tension rod which extends axis-centrally through the base, whereby the tension rod comprises a head resting against a face of the indexable insert, wherein the tension rod has a complementary polygonal section extending through an axis-central polygonal opening of the indexable insert.

2. The machine reamer according to claim 1, wherein the base includes a central polygonal opening near its insert seat, through which polygonal opening extends axially a complementary polygonal section of the tension rod.

3. The machine reamer according to claim 2, wherein the polygonal section comprises one of two polygonal sections of the tension rod that directly follow one another and axially penetrate through a separation point in the area of the insert seat between the indexable insert and the base.

4. The machine reamer according to claim 3, wherein the polygonal sections directly follow the head of the tension rod.

5. The machine reamer according to claim 1, wherein the head of the tension rod rests with a conical clamping surface against a complementary inner cone portion on the face of the indexable insert.

6. A machine reamer comprising a shaft-like base and a reamer head, which axially projects beyond a front of the base, and comprises a one-piece indexable insert for introduction into a front-side insert seat of the base, the indexable insert having an axially projecting shoulder for clamping by a tension rod, which extends axis-centrally through the base, whereby the tension rod comprises a head resting against a face of the indexable insert, wherein the head of the tension rod rests with a conical clamping surface against a complementary inner cone portion on the face of the indexable insert, wherein the base has an axis-central recess at its end not facing the insert seat, in which recess is arranged a tension nut for screwing onto a thread of the tension rod, and a snap ring for holding the tension nut in the recess.

7. The machine reamer according to claim 6, wherein the head of the tension rod is arranged sunk in the inner cone portion of the indexable insert.

8. The machine reamer according to claim 6, wherein the tension rod has an axial bore for loading with a cooling lubricant, and said bore ends in the area of the tension rod head in radial channels leading to blades of the indexable insert.

9. The machine reamer according to claim 8, wherein the radial channels penetrate on the outlet side through the conical clamping surface of the tension rod head, and each said channel ends in an associated free space provided in front of the blades of the indexable insert.

10. The machine reamer according to claim 6, wherein the tension nut is arranged rotatably and axially nonmovably in the recess.

11. A machine reamer comprising a shaft-like base and a reamer head, which axially projects beyond the front of the base, and comprises a one-piece indexable insert for introduction into a front-side insert seat of the base, the indexable insert with an axially projecting shoulder for clamping by a tension rod that extends axis-centrally through the base, whereby the tension rod has a head resting against a face of the indexable insert, wherein the head of the tension rod rests with a conical clamping surface against a complementary inner cone portion on a face of the indexable insert, wherein the base has an axis-central recess at its end not facing the insert seat, in which recess is arranged a tension nut, which can be screwed onto a thread of the tension rod, the tension nut comprising a head portion axially supportable on an annular boundary surface of the axis-central recess and a shaft portion extending through an axial bore of the base, whereby the shaft portion carries at its free end a female thread for screwing onto the thread of the tension rod.

12. The machine reamer according to claim 11, wherein the shaft portion comprises a hollow shaft, and the tension rod includes an axial bore communicating with the inside of the hollow shaft.

13. The machine reamer according to claim 11, wherein the shaft portion of the tension nut has at least one of a larger outside diameter and a greater length than the tension rod.

14. The machine reamer according to claim 11, wherein the tension nut has a polygonal opening for engagement by a screwing tool, wherein the polygonal opening is axially accessible from outside, and corresponds with respect to dimensions to the polygonal opening of the indexable insert.

15. The machine reamer according to claim 14, wherein the polygonal opening of the tension nut comprises a hexagonal recess.

\* \* \* \* \*

UNITED STATES PATENT AND TRADEMARK OFFICE
CERTIFICATE OF CORRECTION

| | | |
|---|---|---|
| PATENT NO. | : 7,431,543 B2 | Page 1 of 1 |
| APPLICATION NO. | : 10/504502 | |
| DATED | : October 7, 2008 | |
| INVENTOR(S) | : Otto Buettiker, Roman Eigenmann and Jacek Kruszynski | |

It is certified that error appears in the above-identified patent and that said Letters Patent is hereby corrected as shown below:

On the title page, item (22) and in column 1, the PCT filing date should be changed to read:

(22) PCT Filed: December 18, 2002

Signed and Sealed this

Twenty-fourth Day of March, 2009

JOHN DOLL
*Acting Director of the United States Patent and Trademark Office*